No. 866,408. PATENTED SEPT. 17, 1907.
O. DE G. VANDERBILT.
RECEPTACLE FOR FISHING TACKLE.
APPLICATION FILED MAY 15, 1905.
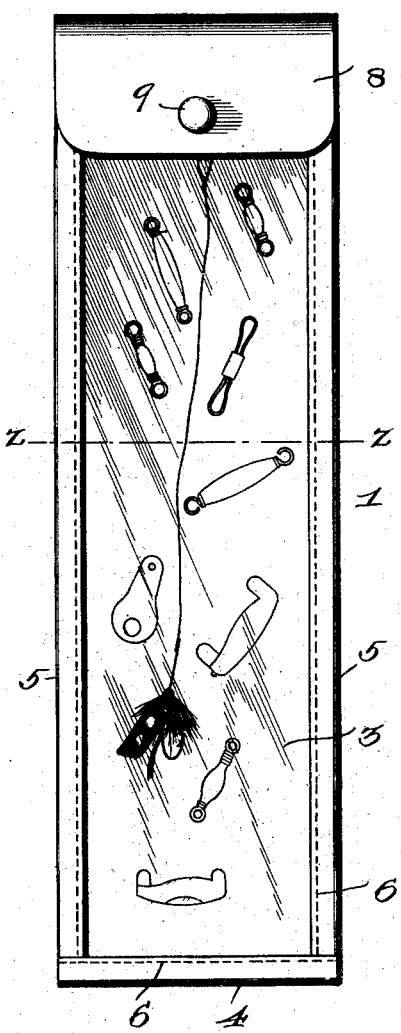
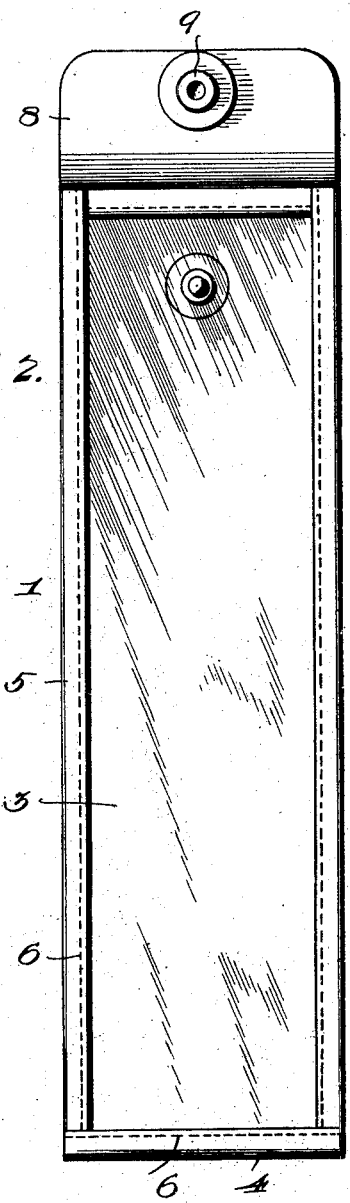
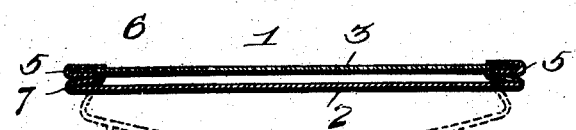
Witnesses
Ivan Konigsberg
Harry H. Walton.
Inventor
Oliver De Gray Vanderbilt
By
Alexander P. Proudfit, Attorney

UNITED STATES PATENT OFFICE.

OLIVER DE GRAY VANDERBILT, OF EAST ORANGE, NEW JERSEY, ASSIGNOR TO ABBEY AND IMBRIE, OF NEW YORK, N. Y., A CORPORATION OF NEW YORK.

RECEPTACLE FOR FISHING-TACKLE.

No. 866,408.     Specification of Letters Patent.     Patented Sept. 17, 1907.

Application filed May 15, 1905. Serial No. 260,438.

*To all whom it may concern:*

Be it known that I, OLIVER DE GRAY VANDERBILT, of East Orange, New Jersey, have invented certain Improvements in Receptacles for Fishing-Tackle, of which the following description, in connection with the accompanying drawing, is a specification, like letters on the drawing designating like parts.

This invention relates to receptacles for holding the smaller articles of anglers' fishing tackle, such as hooks, flies, leaders, split-shot, &c., and has for its object to provide a simple, light, and convenient receptacle of this character by means of which any article contained therein may be ascertained at once on sight, and readily selected and utilized.

The invention consists in a receptacle of this character, as hereinafter set forth and claimed.

Referring to the accompanying drawings,—Figure 1 is a front view of the invention with the open end closed. Fig. 2 is a similar view with the open end unclosed. Fig. 3 is a transverse section on the line z—z, Fig. 1.

In carrying out the invention the receptacle may be of any convenient size and shape, the essential feature of the invention being that a pocket or receptacle is provided adapted to hold the smaller articles of an angler's fishing tackle, such as hooks, flies, leaders, &c., and not only easily accessible but also having a front of thin transparent material by means of which the contents of the receptacle are disclosed, and any article therein may be readily selected.

As shown in the drawing, the receptacle 1, consists preferably of a single pocket, or case, of a length and width suitable to be carried in a coat pocket, and formed with a back 2 of canvas, leather, or other suitable material, preferably made very thin, light and flexible, and with a front 3 of some transparent material, such as celluloid, mica, or other similar transparent material, preferably made very thin, light, and flexible, and secured at its bottom and side edges by stitching, cementing, or in any other suitable manner to the bottom and side edges of the back 2. As shown, the back 2 and front 3 are secured at the bottom edges 4 and side edges 5 by stitching 6; and the back is preferably formed adjacent to its side edges with a plait 7, whereby the back 2 may be pushed out, permitting access to the pocket with the fingers, and the back is normally retained against the front, thereby holding the contents in place, and preventing their being jumbled together in a heap. It is obvious that a number of plaits may be used instead of one, or that any suitable form of folding back may be employed. The open end of the receptacle 1 may be provided with any suitable means for closing the same, and retaining the contents in place, and, as here shown, a flap 8 is provided, folding over the end of the receptacle, and secured to the front 3, by a button 9, or other fastening. With the articles contained in the receptacle arranged in order, and held between the front and back, when an article is desired, the receptacle is held in a horizontal position, and the fingers inserted in the opened end. The back being pushed away from the front by the insertion of the fingers, the article desired may be readily ascertained and seized by the fingers, owing to the transparent front, and drawn out by the fingers.

Having described my invention, I claim:—

1. A receptacle for anglers' tackle, consisting of a pocket having a collapsible back and a transparent front, substantially as herein set forth.

2. A receptacle for anglers' tackle, consisting of a pocket having a thin transparent front and a thin flexible back, normally held toward the front, and separable from the front, substantially as herein set forth, and means for closing the open end of the receptacle, substantially as herein set forth.

Signed at New York city in the county of New York and State of New York this 2nd day of May A. D. 1905.

OLIVER DE GRAY VANDERBILT.

Witnesses:
MAY E. THOMAS,
HENRY WHITE.